United States Patent [19]

Fischer

[11] 4,263,339

[45] Apr. 21, 1981

[54] PROCESS FOR THE PRODUCTION OF ELECTROLUMINESCENT POWDERS FOR DISPLAY PANELS

[75] Inventor: Albert G. Fischer, Dortmund, Fed. Rep. of Germany

[73] Assignee: Brown, Boveri & Cie Aktiengesellschaft, Mannheim, Fed. Rep. of Germany

[21] Appl. No.: 51,598

[22] Filed: Jun. 25, 1979

Related U.S. Application Data

[60] Division of Ser. No. 906,887, May 17, 1978, Pat. No. 4,181,753, which is a continuation-in-part of Ser. No. 715,715, Aug. 19, 1976, Pat. No. 4,143,297.

[51] Int. Cl.$^3$ ....................... B05D 5/06; C09K 11/30; C09K 11/50

[52] U.S. Cl. ....................................... 427/64; 427/66; 427/68; 427/215; 252/301.6 S

[58] Field of Search .................. 252/301.6 S; 427/64, 427/66, 68, 215

[56] References Cited

U.S. PATENT DOCUMENTS

| | | | |
|---|---|---|---|
| 2,704,726 | 3/1955 | Markoski | 252/301.6 S X |
| 2,782,168 | 2/1957 | Fetters | 252/301.6 S X |
| 2,874,128 | 2/1959 | Wachtel | 252/301.6 S |
| 3,076,767 | 2/1963 | Farv et al. | 252/301.6 S |
| 3,984,586 | 10/1976 | Kawarada et al. | 252/301.6 S X |

*Primary Examiner*—Jack Cooper
*Attorney, Agent, or Firm*—Thomas H. Murray

[57] ABSTRACT

A process is provided for producing electroluminescent powders for use in information display panels of the type in which a monoparticle layer of electroluminescent powder is embedded in a high dielectric constant resin between two electrodes. The powders are zinc sulfide powders coactivated with aluminum and capable of emitting white light, as well as light of various colors. In the production of these powders they are treated to form an impermeable inorganic surface coating on the powder particles. The coating may be zinc phosphate or glass.

8 Claims, 3 Drawing Figures

OLD
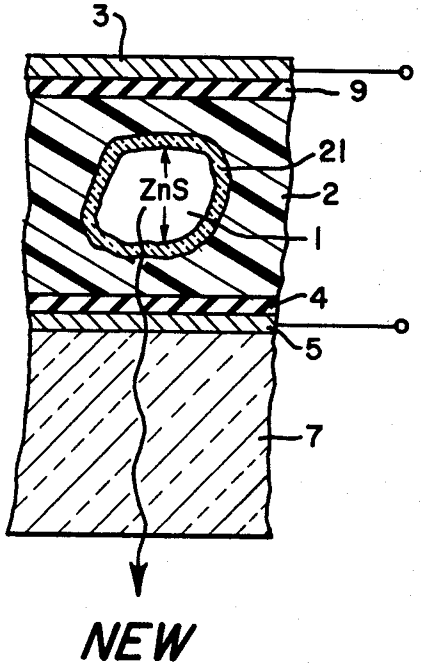
NEW
Fig. 2B

PROCESS FOR THE PRODUCTION OF ELECTROLUMINESCENT POWDERS FOR DISPLAY PANELS

CROSS-REFERENCE TO RELATED APPLICATION

The present application is a division of my prior copending application Ser. No. 906,887 filed May 17, 1978 now U.S. Pat. No. 4,181,753 which was a continuation-in-part of my prior copending application Ser. No. 715,715, filed Aug. 19, 1976 now U.S. Pat. No. 4,143,297.

BACKGROUND OF THE INVENTION

The present invention relates to the production of information display panels having at least one zinc sulfide powder electroluminescent layer, in which the electroluminescent (EL) powder is coactivated with aluminum and is formed as a monoparticle layer embedded in a high dielectric constant thermoplastic resin which is protected against voltage breakdown by thin evaporated oxide layers on both sides. The resin is preferably partially dyed with organic light-absorbing dyes to improve the contrast and/or fluorescent dyes for the production of white or colored light.

Such display panels are useful for color television screens as well as numerical displays or other types of information display panels. The EL powder layer embedded in high dielectric constant resin, together with a transparent front electrode and a black rear electrode, forms a capacitive light-emitting element which is excited into emission by application of a high-frequency alternating voltage. A plurality of such capacitive light-emitting elements can be arranged in a panel to form, for example, a seven-segment display or a TV matrix.

The use of an EL powder layer results in a very small layer thickness corresponding to the diameter of a single powder grain. This is less than the thickness of known single-crystal layers such as are disclosed in this relation in Motson U.S. Pat. No. 3,037,138. The use of phosphors in powder form is known from Lehmann U.S. Pat. No. 2,924,732, although with no suggestion of a monoparticle layer. Lehmann also teaches the following:

(a) The so-called "cascade electroluminescence", that is, the mixture of an EL powder as a primary emitter with a photofluorescent material. Thus, to obtain a red component, a short-wave blue-emitting EL material is mixed with one or two components having longer wave red fluorescence. The basis for this practice lies in the generally known characteristic of EL powder layers that they can emit blue, green or yellow-orange light when used with phosphors such as those of Lehmann, but white light can be obtained only by use of zinc sulfide powder mixtures. Therein lies a further essential difference of the last-mentioned powder layers from vapor-deposited EL layers which emit yellow light. With cascade luminescence, white light can be obtained from blue-luminescing EL powder by admixture with green, yellow or red fluorescing organic materials, and with no color change in aging.

(b) The admixture of organic, preferably red fluorescing pigments, for example, rhodamine B.

(c) Coactivation with aluminum in order to make the emitted color value largely independent of the exciting frequency.

A difficult problem for practical use (in color TV) is presented by aging of the EL layers which results in loss of light intensity of the individual components with resulting change in color value or hue.

SUMMARY OF THE INVENTION

The invention relates to the problem of improving the reliability and long-time stability of information display panels for different fields of use extending from seven-segment numerical displays to flat color TV screens.

In accordance with the invention, these results are obtained by coating the electroluminescent powder particles with an impermeable, inorganic, isolating coating or film before they are embedded in the resin. This microencapsulation inhibits the aging process of the light-emitting particles. Preferably, this stabilization is obtained by means of a phosphate coating or a glass coating, preferably vapor-deposited.

For the production of a phosphate coating, the following procedure is advantageous:

(a) Zinc sulfide powder is doped with at least one cation selected from the group consisting of aluminum, copper and magnesium, the cation being preferably added in the form of a halogen compound dissolved in an organic solvent.

(b) The doped powder is heated in hydrogen sulfide at about 800° C. to 1050° C., initially in a very slow gas stream (grain growth phase), and then in a faster gas stream (halogen expulsion phase).

(c) The powder is finally post-heated at about 350° C. to 550° C. in molten sulfur to which copper, arsenic and/or antimony are added as sulfides in small amounts (about 1%).

(d) The powder particles are freed of sulfur and then coated. The particles are initially oxidized by means of hydrogen peroxide and finally phosphated, preferably by means of orthophosphoric acid, or a glass coating is deposited on the particles.

BRIEF DESCRIPTION OF THE DRAWING

The invention will be more fully understood from the following detailed description, taken in connection with the accompanying drawing, in which:

FIGS. 2A and 2B are similar views on a much larger scale showing, respectively, conventional EL particles and the encapsulated EL particles of the present invention.

DESCRIPTION OF THE PREFERRED EMBODIMENT

Figure 1:
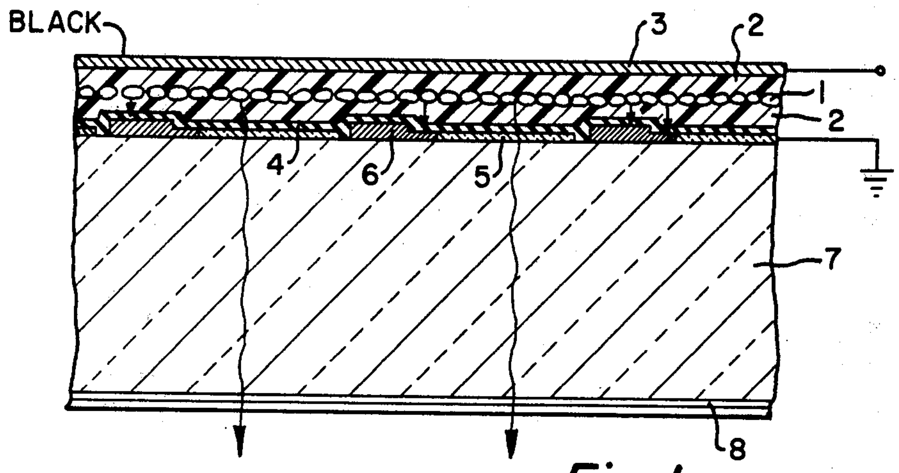
FIG. 1 is a somewhat diagrammatic sectional view of a display panel with an EL monoparticle layer.

Instead of highly loading a resin layer with light-emitting zinc sulfide powder with random orientation of the particles, in accordance with the present invention and as shown in FIG. 1, only a single densely packed layer of electroluminescent particles, that is, a monoparticle layer, is embedded in the resin 2. A black rear electrode 3 covers this resin layer on the back and may be protected by a glass plate (not shown). On the front, the resin layer 2 is coated with a vapor-deposited insulating oxide film 4, such as $Y_2O_3$, for example, which is followed by a transparent front electrode 5 which can consist of $SnO_2$:Sb or $In_2O_3$:Sn, or similar transparent coatings produced by pyrolysis or by sputtering. The front electrode 5 can also consist of a very thin, transparent gold layer. The conductivity of the transparent front electrode 5 can be enhanced by vacuum-deposited metal strips 6 on which thin film transistors can be simultaneously applied.

The monoparticle layer 1 has little tendency for scattering or reflection of light. The use of the black rear electrode 3 increases the contrast between the light-emitting elements (those excited with an AC voltage) and the non-emitting elements because of the absence of reflection of ambient light. The electrode structure with the monoparticle layer embedded in resin is carried on a glass substrate 7 which is provided with an anti-reflection coating 8 on its outer side.

Previously-known capacitive light-emitting elements have the disadvantage that they must be excited with high voltages (several hundred volts) and with high frequency. The reason for this is that in order to obtain high light intensity, thick white layers highly loaded with zinc sulfide powder have been used, which require high voltage to reach the necessary field strength. Furthermore, in order to optimize the dielectric constant of the embedding resin 2, it should be greater than that of zinc sulfide so that the multielement display to be produced can be addressed by transistors or integrated switching circuits.

The particles 1 of the monoparticle layer of the present invention have an average size of 10 microns so that the total thickness including the resin layer 2 only amounts to about 20 microns. In order to make impossible accidental bridging between electrodes by the particles, and resulting short-circuiting at these weak places in the resin layer 2, insulating oxide films 4 and 9 are placed on both sides of the layer 2, preferably by vacuum-deposition. These oxide films are only about 0.5 micron thick and can withstand more than 150 volts. The rear oxide film 9 can consist of $As_2O_3$.

The dielectric constant of the resin layer 2 is made very high ($\epsilon=20$) compared to that of the embedded zinc sulfide particles 1 ($\epsilon=10$). This makes use of the known effect that in a dielectric structure of three layers, where the middle layer has a lower dielectric constant $\epsilon_1$ while the two outer layers have a higher dielectric constant $\epsilon_2$, the field strength in the middle layer is $\epsilon_2/\epsilon_1$ times higher than that in the outer layers. Since the light intensity B is expressed by:

$$B=\text{const. } \exp -CE^{\frac{1}{2}} (C=\text{constant})$$

it depends strongly on the field strength E. By use of a high dielectric constant embedding material, the brightness of the light-emitting elements is substantially increased for the same excitation voltage. In other words, a given light intensity B can be attained with a lower voltage if the resin 2 has a higher dielectric constant. The resin used is preferably cyanoethyl starch plasticized with 50% by weight of cyanoethyl sucrose.

The production of the electroluminescent layer will now be described.

Initially it is necessary to insure that the EL powder layer emits white light as is required, for example, for black and white TV, and not only blue, green or yellow light. For this purpose, the electroluminescence of AC excited zinc sulfide powder will be used because of its previously-described advantages. The production of blue- or green-emitting luminescent powders of adequate efficiency is relatively simple. Except for the procedure disclosed in the above-mentioned Lehmann patent, however, effective red-emitting EL powders, or primary red-radiating powders, are still not known. If a white light-emitting mixture is to be produced by mixing the above-mentioned three different-color powders together, a large quantity of a weak red-emitting powder must be used and accordingly the total brightness would be low.

White-emitting luminescent powders have been proposed heretofore. In the course of the preliminary work leading to the present invention, however, it was established that these white-emitting zinc sulfide/copper-manganese powders changed the color temperature of their white emission upon increase of the excitation frequency. At excitation frequencies above 5 kilohertz, this powder appears unusable since the yellow zinc sulfide/manganese emission band saturates, while the blue zinc sulfide/copper Cl emission band continues to become stronger. As previously mentioned, however, in order to obtain a high light intensity, these displays or image screens should be operated at the highest possible frequency, for example, 10 kilohertz.

Several alternative solutions for this problem were worked out for production of information display panels according to the invention. It was found that a white-emitting mixture can be produced which has high brightness at 10 kilohertz and a color tone which is independent of changes in the exciting frequency. It consists of an intimate physical mixture of ZnS/Cu,I, or blue-emitting ZnS:Cu,Al, luminescent powder with yellow-emitting $ZnS_{0.2}Se_{0.8}$Cu,Al, in the proportion of 30:70% by weight. If the blue component is increased, a cold white light is obtained, while increasing the yellow component results in a warm white emission.

A second proposal for the solution of the problem uses the "cascade electroluminescence" effect disclosed by Lehmann. In this case, a blue-emitting luminescent monoparticle layer is used which is embedded in a resin mixed with a yellow fluorescent organic pigment. The yellow fluorescence is excited by the blue electroluminescent light, part of which penetrates through the resin and reaches the observer's eye together with the yellow light (additive color mixing). The same blue-emitting luminescent powder described above can be used. It was established that cyanoethyl/starch/sucrose can be used as the embedding resin which can be mixed with rhodamine 66 G or, still better, with a commercially-available fluorescent pigment such as Arc Chrome-yellow which can be excited by daylight.

In the case of color TV screens where color tones are required which are made up of the three primary colors in varying amounts, the blue-emitting luminescent powder can be embedded in a resin which is mixed with green- and red-emitting organic pigments. Such pure pigments are fluorescein and rhodamine B. The commercially-available daylight-excited pigments "Signal green" and "Rocket red" appear to be even more suitable. Other possibilities are also conceivable.

Improvements in the EL powders which are used in the information display panels of the present invention will now be described.

El powders are required for these displays which do not change their emission color when the excitation frequency changes, while the commercially-available powders shift their emission colors toward shorter wavelengths, for example, from green toward blue, when the excitation frequency increases, for example, from 5 kilohertz to 8 kilohertz. This is not acceptable in a display.

Furthermore, a powder is required which has longer operating life at 10 kilohrtz excitation. Most powders have a very short half-life at this high frequency, that is, the time in which the initial light intensity falls to half its value. For certain types of black-and white television receivers, blue-emitting powder and yellow-emitting powder are needed for the purpose of color mixing. For alpha-numeric displays, a green-emitting powder with good operating characteristics is desired because of the optimum sensitivity of the eye in this range.

It is already known that the blue shift of the color tone does not occur with iodine coactivated ZnS:Cu EL powders. These, however, have only a short operating life. It is likewise known that the blue shift does not occur in aluminum coactivated ZnS:Cu EL powders. These, however, are poorly crystallized and consequently are very inefficient, although they have a long service life. A new method has been developed which avoids the disadvantages of both powders and combines their advantages.

The following production formula is given as an example of a non-aging, constant frequency, green-emitting electroluminescent powder material.

Chemically precipitated zinc sulfide powder is initially preheated in pure hydrogen sulfide at 600° C. in order to drive off all traces of oxygen and moisture. This powder is then doped with 1 mol percent copper halide (preferably the iodide), 0.1 mol percent aluminum halide (preferably the iodide), and 1 mol percent magnesium fluoride, using alcohol solutions for the copper and aluminum salts. After mixing and drying, this powder is then initially heated for 1 hour at 1000° C. in almost stagnant, or very slow moving, hydrogen sulfide. During this phase, crystal growth occurs with the help of the halogen vapors which serve as a gas-phase transport means to promote the growth. The crystal lattice of the zinc sulfide now includes copper and aluminum as well as halogen ions. This is followed by a further 2 hour heating in faster flowing hydrogen sulfide, during which the halogen is carried off, including that already dissolved in the crystal lattice so that ZnS:Cu,Al remain. The powder particles are well crystallized with well-developed faces. If the heating were carried out without addition of the halogen, the crystals would be poorly crystallized and would appear in the microscope like coke fragments. The well-crystallized particles glow brightly in the field and show constant color at varying frequency and long service life, which is ascribed to the aluminum coactivation.

The powder is then heated again in molten sulfur at 550° C., under nitrogen pressure of 100 bar in order to prevent vaporizing of the sulfur (sulfur boils at 1 bar at 425° C.). This sulfurization is carried out in a high pressure autoclave. After cooling, the sulfur is dissolved out with carbon disulfide. The EL powder is now introduced into boiling phoshoric acid, so that a zinc phosphate coating forms on each particle, or a glass coating is deposited on the particles. The surface is thereby passivated. After washing and drying the EL powder is ready for use. It glows green at 10 kilohertz excitation with long service life.

A yellow-emitting EL powder can be produced in a similar manner which has no blue-shift of the emission on increase of the exciting frequency. 20 mol percent zinc sulfide is mixed with 80 mol percent zinc selenide. After doping with a concentration between 0.10 and 0.01 mol percent of copper and aluminum halides, this mixture is heated for 3 hours at 850° C., first in stagnant and then in flowing forming gas ($N_2$+20% $H_2$ by volume). After cooling and washing in potassium cyanide, the powder is then treated at 500° C. in a molten sulfur-selenium mixture of the same molar composition as the powder under 100 nitrogen pressure. After cooling, the sulfur-selenium is dissolved out with concentrated potassium cyanide solution. The powder is then boiled in concentrated phosphoric acid in order to form a zinc phosphate coating on the particles to passivate the surface, or a glass coating is deposited on the particles. After washing and drying, the yellow-emitting powder is ready for use.

In an analogous manner, frequency-stable, long-lived zinc-cadmium sulfide EL powder can be produced with blue-green, green or orange emission. The recipe for a green-emitting powder is as follows: Preheated oxygen-free zinc sulfide powder (80 mol percent) is mixed with 20 mol percent of similarly pretreated cadmium sulfide powder. As before, the mixture is doped with an alcohol solution of copper and aluminum halides and heated at 800° C. for three hours in hydrogen sulfide; first in stagnating hydrogen sulfide, then in flowing gas. After cooling and washing in a potassium cyanide solution to remove the precipitated copper, the powder is then treated at 500° C. in molten sulfur under pressure. After cooling and freeing from sulfur by dissolving it out with carbon disulfide, the powder is phosphated for passivating the surface. The powder is then ready for use.

Before the treatment in phosphoric acid, a similar treatment can be given in hydrogen peroxide whereby the particle surfaces are initially converted to zinc-cadmium oxide. This is then converted by the phosphoric acid into zinc or zinc-cadmium phosphate, whereas direct action of phosphoric acid on the sulfide apparently results in a zinc-cadmium thiophosphate.

In addition to doping with copper and aluminum, the powder can also be doped with magnesium (up to several mol percent). As will be explained, this addition increases the service life by fixing the luminescence producing sulfur vacancies in the crystal lattice. These would otherwise migrate slowly to the surfaces.

The three above-described processes are based on the following observations.

The halogen which is introduced into the crystal lattice of the zinc sulfide, or zinc sulfide mixture, is used as a chemical transport agent which promotes crystal growth during the first hour of the heating process. This leads to well-formed microcrystallites which are necessary for high luminescent output.

During the further heat treatments, the halogen atoms diffuse out of the powder while the aluminum and copper remain behind. Coactivation with the above-mentioned cations, instead of halogen atoms, increases the life because later diffusing out of halogen atoms during use of the powder would lead to undesired corrosion and aging phenomena. It must be added that in addition to aluminum and copper, magnesium is also successful as a doping agent. It is recommended to add a part of the cations as iodides in order to improve the crystal growth resulting from the halogen vapors.

For the heat treatments, hydrogen sulfide should be used as the carrier gas and in the first phase (grain growth phase), the gas stream should be introduced very slowly, while in the second phase (halogen expulsion phase), the hydrogen sulfide gas stream should be faster. The subsequent reheating of the powder to medium temperatures in molten sulfur (about 350° C. to 550° C.) has the purpose of greatly reducing the concentration of sulfur vacancies or anion vacancies in the crystal lattice. Such vacancies are undesirable since they exhibit a state of negative electric charge, and thus promote the diffusion of positively-charged copper ions. This appears to be the main cause of aging. The addition of aluminum and/or magnesium is important in order to maintain the linear vacancies present in the crystal lattice during longer operating times. Furthermore, an addition of about 5% cadmium sulfide (hexagonal) dissolved in the lattice insures that the tendency of zinc sulfide to revert from hexagonal to cubic during the heating treatment is strongly reduced. The linear vacancies are thus now fixed in the crystal for the first time and are no longer mobile. In the above-described post-treatment in molten sulfur at about 350° C. to 550° C., arsenic and/or antimony as well as copper can be admixed as sulfides in small amounts (for example, about 1%). With this so-called "coppering and sulfurizing process", the fixed linear vacancies are invested with highly conducting copper sulfide which, according to the "Fischer model" is responsible for the electroluminescence.

Figure 2A:
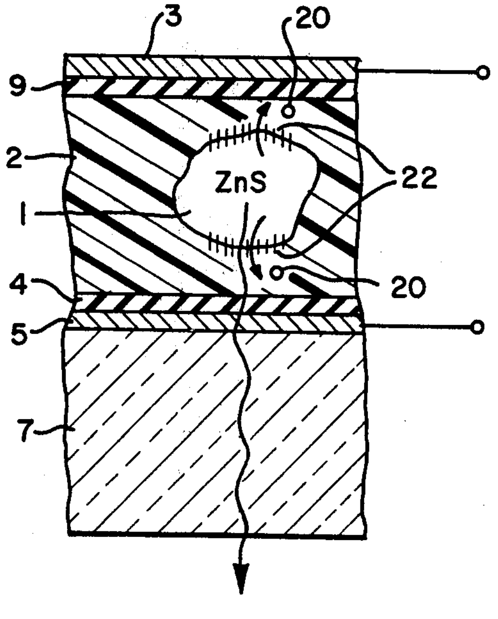

In a further step, the crystal faces of the particles are then stabilized by a surface coating 21 (FIG. 2B). For this purpose, the powder is initially heated for 10 minutes in hydrogen peroxide whereby the zinc sulfide surface is converted to zinc oxide. Thereafter, the powder is heated in orthophosphoric acid, whereby the zinc oxide is converted into a dense, water-insoluble, impermeable zinc phosphate coating. This phosphate surface coating prevents the emission of unbound electrons into the resin 2, as shown at 20 in FIG. 2A in connection with an unstabilized particle, which can produce undesired aging by electrolytic reactions. The surface coating also obstructs migration of linear vacancies in connection with out-diffusion of copper and in-diffusion of oxygen, which are also aging processes. The stabilizing coating 21 prevents also any decomposition of the particle 1 at its upper and lower interfaces 22 with the resin 2. The stabilizing coating 21 can also consist of chemically vapor-deposited glass with a thickness of about 5000 Angstroms. This glass coating is produced by pyrolytic decomposition of metal-organic vapors.

I claim as my invention:

1. In a process for producing electroluminescent powder for display devices having a monoparticle layer of electroluminescent powder embedded in a high dielectric constant resin between two electrodes, the steps of doping zinc sulfide powder with at least one halogen compound of a cation selected from a class consisting of aluminum, copper and magnesium, said halogen compound being dissolved in an organic solvent, heating the doped powder initially in an atmosphere of essentially stagnating hydrogen sulfide at a temperature of about 800° to 1050° C. to effect grain growth and then in a moving hydrogen sulfide gas stream to drive off halogen vapors, thereafter heating the powder to about 350° C. to 550° C. in molten sulfur and adding thereto a small amount of sulfide selected from the class consisting of copper, arsenic and antimony, dissolving the sulfur out of the powder and coating the particles of said powder with an impermeable passivating inorganic surface coating of zinc phosphate or glass.

2. The process of claim 1 wherein said powder is heated in molten sulfur under a nitrogen pressure of 100 bar.

3. The process of claim 1 wherein sulfur is dissolved out of the powder with carbon disulfide.

4. In a process for producing electroluminescent powder for display devices having a monoparticle layer of electroluminescent powder embedded in a high dielectric constant resin between two electrodes, the steps of doping zinc sulfide-zinc selenide powder with at least one halogen compound of a cation selected from the class consisting of aluminum, copper and magnesium, said halogen compound being dissolved in an organic solvent, heating the doped powder initially in an atmosphere of essentially stagnating hydrogen sulfide at a temperature of about 800° to 1050° C. to effect grain growth and then in a moving hydrogen sulfide gas stream to drive off halogen vapors, thereafter heating the powder to about 350° C. to 550° C. in a molten sulfur-selenium mixture of the same molar composition as the powder and adding thereto a small amount of sulfide selected from the class consisting of copper, arsenic and antimony, dissolving the sulfur-selenium mixture out of the powder and coating the particles of said powder with an impermeable, passivating inorganic surface coating of zinc phosphate or glass.

5. The process of claim 4 wherein said powder is heated in a molten sulfur-selenium mixture of the same molar composition as the powder under a nitrogen pressure of 100 bar.

6. The process of claim 4 wherein, after cooling, the sulfur-selenium mixture is dissolved out with potassium cyanide solution.

7. The process of claim 4 wherein said particles are coated by boiling them in phosphoric acid.

8. The process of claim 1 or 4 wherein said particles are coated by heating them in hydrogen peroxide and then boiling them in orthophosphoric acid.

* * * * *